United States Patent Office 3,826,765
Patented July 30, 1974

3,826,765
PROCESS OF MAKING ANTILUMPING EXPANDABLE STYRENE POLYMERS
Timothy Altares, Jr., Valencia, Pa., assignor to Arco Polymers, Inc.
No Drawing. Filed May 10, 1973, Ser. No. 358,984
Int. Cl. C08j 1/26
U.S. Cl. 260—2.5 B
2 Claims

ABSTRACT OF THE DISCLOSURE

Expandable styrene polymer particles are surface-coated with poly(methyl methacrylate) to prevent the particles from lumping together during expansion. The coating is applied by adding a mixture of 0.03-0.30 of poly(methyl methacrylate) and 0.01-1.5 parts of tricalcium phosphate to 100 parts of expandable polymer particles suspended in an aqueous medium.

BACKGROUND OF THE INVENTION

This invention relates to a process for making expandable styrene polymer particles non-lumping on pre-expansion.

The making of low density, cellular, shaped, plastic articles from expandable particles of styrene polymers is well known. Such particles generally contain a blowing agent which boils below the softening point of the polymer and which will cause the particles to expand when they are heated.

The particles are generally pre-expanded before introduction into the mold to provide better fusion and less density variation in the molded article. Such a pre-expansion is described in U.S. 3,023,175 and U.S. 3,577,360.

These pre-expanded particles are placed into a mold cavity which defines the shape of the desired finished article. The particles are heated above their softening point, whereupon the particles expand to fill the mold cavity and fuse together.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the molded article can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often serious reduction in fusion of the particles on molding. U.S. 3,520,833, teaches the addition of lecithin during the impregnation of the particles with the blowing agent. Unfortunately the lecithin imparts an undesirable odor to the molded articles. U.S. 3,462,293, teaches to coat the particles with polymeric materials by a fluid bed process. This process involves an additional expense of fluidizing the particles and coating with the polymer latexes.

SUMMARY OF THE INVENTION

It has now been found that anti-lumping, pre-expanded particles are produced by coating expandable styrene polymer particles with a poly(methyl methacrylate) applied as a mixture with tricalcium phosphate to the particles in an aqueous suspension. The methacrylate-phosphate mixture may be added to the suspended particles immediately following the impregnation with blowing agent or may be added to an aqueous suspension of impregnated polymer particles.

DETAILED DESCRIPTION OF THE INVENTION

In accordance with this invention, a variety of expandable thermoplastic homopolymers and copolymers can be rendered anti-lumping. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles either during the polymerization, as in U.S. 3,192,169, or after the polymerization, as in U.S. 2,983,692.

The blowing agents are compounds which are gases or which will produce gases on heating. Preferred blowing agents include aliphatic hydrocarbons containing from 1-7 carbon atoms in the molecule, such as methane, ethane, propane, butane, pentane, cyclopentane, hexane, heptane, cyclohexane, and their halogenated derivatives which boil at a temperature below the softening point of the polymer. Mixtures of these agents may also be used, such as a mixture of 40-60% n-pentane and 60-40% trichlorofluoromethane. Usually from 3 to 20% of blowing agent per 100 parts of polymer is incorporated by the impregnation.

The impregnation is conventionally carried out at temperatures ranging from about 60° to 150° C. Increasing the temperature makes the impregnation proceed at a faster rate.

After the impregnation is completed, the suspension of polymer particles is cooled to room temperatures to allow separation of the impregnated beads from the aqueous phase. In the present invention, the suspension is allowed to cool to about 60° C. and then a mixture of poly(methyl methacrylate) and fresh tricalcium phosphate is added to coat the particles with the methacrylate polymer.

The poly(methyl methacrylate) is used in amounts of from 0.03 to 0.30 part per 100 parts of polymer particles. The methacrylate may be conveniently used as an aqueous latex having 30-40 percent solids.

The tricalcium phosphate may be added in amounts as small as 0.01 part, or as large as 1.5 parts, per 100 parts of polymer particles. Even though tricalcium phosphate is used as suspending agent in the polymerization or the impregnation step, some fresh phosphate is required.

Within the concentration limits recited, the ratio of phosphate to methacrylate solids useful in the invention is between 30 to 1 and 1 to 4. Ratios using the lesser amounts of phosphate are preferred, such as those below 1 to 2.

Excess phosphate does not appear to affect the anti-lump properties of the pre-expanded particles, but may affect the fusion during subsequent molding.

The preferred method for using the coating agents is to premix the poly(methyl methacrylate) and the tricalcium phosphate, adding sufficient water to make the premixed slurry fluid. The fluid slurry is then added to the cooled suspension of impregnated polymer particles, and the whole is stirred while cooling to room temperature.

The coated, impregnated particles are separated from the aqueous phase by the usual means, such as centrifugation after acidification with hydrochloric acid. The particles are then washed with water and dried.

It will be obvious to those skilled in the art that the coating process of the present invention may also be applied to polymer particles which contain various other additives, such as dyes, pigments, self-extinguishing agents, anti-static agents, plasticizers or the like.

The invention is further illustrated by the following examples wherein parts are parts by weight unless otherwise indicated.

Example I

To a stirred vessel, there was charged in sequence 100 parts of water, 100 parts of polystyrene beads having a particle size of predominantly through 16 and on 35 mesh, U.S. Standard Sieve, 1.2 parts of tricalcium phosphate, 0.0047 part of sodium dodecylbenzenesulfonate, and 8.0 parts of a mixture of 70% isopentane and 30% n-pentane. The mixture was stirred and heated during 1 hour to 90° C. to form a suspension. The suspension was maintained at 90° C. for 3 hours and then the temperature was raised during 0.5 hour to 115° C. and maintained at that temperature for an additional 6 hours to impregnate the beads with the blowing agent. The suspension was divided into two portions.

One portion, a control, was cooled to about 40° C. and acidified to a pH of about 1.5 with HCl. The beads were separated from the aqueous phase by centrifuge, washed with water, and air dried at room temperature.

The other portion was cooled to 60° C. A pre-mixed slurry of 0.04 part of tricalcium phosphate, 0.12 part of poly(methyl methacrylate) (added as aqueous latex having about 30% solids), and 0.35 part of water was added to the suspension and the whole stirred while cooling to 40° C. The mixture was acidified to a pH of about 1.5 with HCl. The beads were separated from the aqueous phase by centrifuge, washed with water, and air dried at room temperature.

The beads from the control portion were pre-expanded in a Rodman Pre-Expander (U.S. 3,023,175) to a density of about 1.25 p.c.f. The control beads were found to have in excess of 30% lumps.

Similar treatment of the beads treated with the poly-(methyl methacrylate) gave pre-expanded beads having little or no lumps (<0.05%).

Examination of the beads treated with poly(methyl methacrylate) under an electron scanning microscope showed that the beads were evenly coated on their surface with the poly(methyl methacrylate).

Example II

The procedure of Example I was repeated several times. After the impregnation with blowing agent was completed, the suspensions were cooled to 60° C. and various pre-mixed slurries having the designated combination of 0.04 part of tricalcium phosphate (TCP), 0.12 part of poly(methyl methacrylate) (PMMA), and 0.35 part of water were added as indicated in Table I. The resulting beads were recovered and pre-expanded to a density of less than 2.0 p.c.f. as in Example I. The results are shown in the Table.

TABLE I

| Run number | Pre-mix composition | Percent lumps |
|---|---|---|
| 1 | None | >30 |
| 2 | TCP, PMMA, water | <0.05 |
| 3 | PMMA, water | >30 |
| 4 | TCP, water | >30 |
| 5 | TCP, PMMA* | >0.05 |

*The slurry was difficult to add because of the absence of added water

The data illustrate the ineffectiveness of either the TCP or the PMMA alone. Only the mixture of TCP and PMMA gives the desired anti-lump properties to the beads.

Example III

To illustrate the broad ratios of tricalcium phosphate (TCP) to poly(methyl methacrylate) (PMMA) which can be used to give good anti-lump properties, a series of impregnations were done according to the method of Example I and to each was added a pre-mixed slurry of TCP, PMMA, and water having the compositions per 100 parts of beads shown in Table II. The percent lumps in the pre-expanded beads is shown.

TABLE II

| Parts of TCP | Parts of PMMA | TCP/PMMA ratio | Percent lumps |
|---|---|---|---|
| None | None |  | >30 |
| 0.9 | 0.03 | 30/1 | Nil |
| 1.2 | 0.05 | 25/1 | Nil |
| 0.9 | 0.075 | 12/1 | Nil |
| 0.7 | 0.075 | 9/1 | Nil |
| 0.3 | 0.075 | 4/1 | Nil |
| 0.07 | 0.21 | 1/3 | Nil |
| 0.03 | 0.09 | 1/3 | Nil |
| 0.02 | 0.08 | 1/4 | Nil |

The data shows the ratios of TCP/PMMA from 30/1 to 1/4 are effective in preventing lumping of the pre-expanded beads, provided a minimum of 0.02% TCP is used. It also shows that the amount of PMMA which is effective can vary from 0.03 to about 0.3 part per 100 parts of beads. The minimum amount of PMMA which can be used is dependent on the surface area of the particular size polymer beads being coated. It should be noted that on molding of the various coated beads into 5" x 5" x ½" foams, all of the above samples had greater than 70% fusion, but those with the lower amounts of phosphate had higher percent fusion than the others.

Example IV

To each of two 12-ounce crown capped bottles was added 100 parts of water, 0.05 part of sodium dodecylbenzenesulfonate, and 100 parts of expandable polystyrene beads containing 6.5% by weight of n-pentane and a self-extinguishing agent. The bottles were stirred vigorously after each addition to insure a good suspension of the mixture. To one of the bottles was added a slurry of 0.1 part of tricalcium phosphate and 0.05 part of poly-(methyl methacrylate) solids (added as a 30%-solids latex). Both bottles were capped and rolled on a ball-mill roller for 30 minutes. The bottles were then opened and the contents acidified with HCl. The beads were separated from the water, washed with water, and dried.

On pre-expansion, the beads containing methacrylate coating had no lumps, while the control beads showed greater than 30% lumps.

What is claimed is:

1. In a process for making expandable styrene polymer particles by suspending styrene polymer particles in water containing a difficulty water-soluble inorganic suspending agent which may be extended by a surface-active agent and thereafter impregnating said particles with a blowing agent, the improvement comprising: adding to the suspension of impregnated particles a pre-mixed slurry of tricalcium phosphate and poly(methyl methacrylate) to coat the surface of the particles with the methacrylate polymer, and separating said coated particles from the aqueous phase; said pre-mixed slurry comprising from 0.03 to 0.30 part of poly(methyl methacrylate) per 100 parts of polymer particles and a ratio of phosphate to methacrylate solids of between 30 to 1 and 1 to 4.

2. The process of Claim 1 wherein said poly(methyl methacrylate) is in the form of an aqueous latex having 30–40% solids.

References Cited

UNITED STATES PATENTS

| | | | |
|---|---|---|---|
| 3,428,579 | 2/1969 | Strahnecker et al. | 260—2.5 B |
| 3,462,293 | 8/1969 | Voris | 260—2.5 B |
| 2,983,692 | 5/1961 | D'Alelio | 260—2.5 B |
| 3,027,334 | 3/1962 | Wright | 260—2.5 B |

MORTON FOELAK, Primary Examiner

U.S. Cl. X.R.

260—901